United States Patent [19]

Yerkovich et al.

[11] Patent Number: 5,208,541
[45] Date of Patent: May 4, 1993

[54] SPARK PLUG FIRING SENSOR WITH CAPACITIVE COUPLING AND OPTICAL PICKUP

[76] Inventors: Daniel Yerkovich, 11811 Willows Rd. Northeast, Redmond, Wash. 98052; John M. Adams, 4704 - 194th Ave. Southeast, Issaquah, Wash. 98027; Stephen T. Vincent, 14208 Northeast 73rd St., Redmond, Wash. 98052

[21] Appl. No.: 718,349

[22] Filed: Jun. 19, 1991

[51] Int. Cl.⁵ ............... G01R 31/00; G01R 19/145; G01P 3/36
[52] U.S. Cl. .................................. 324/395; 324/393; 324/402; 324/96
[58] Field of Search ............... 324/390, 393, 395, 399, 324/402, 133, 96

[56] References Cited

U.S. PATENT DOCUMENTS

| | | | |
|---|---|---|---|
| 2,496,197 | 1/1950 | Buck | 175/183 |
| 3,017,568 | 1/1962 | Barnes | 324/18 |
| 3,369,175 | 2/1968 | Morris | 324/17 |
| 3,978,720 | 9/1976 | Ford | 73/116 |
| 3,991,367 | 11/1976 | Chapman et al. | 324/133 |
| 4,032,843 | 6/1977 | Loucks | 324/96 |
| 4,052,665 | 10/1977 | Gruenwald | 324/402 X |
| 4,224,570 | 9/1980 | Meserow | 324/402 |
| 4,547,729 | 10/1985 | Adolfsson et al. | 324/96 |
| 4,928,067 | 5/1990 | Lind | 324/96 |
| 5,015,944 | 5/1991 | Bubash | 324/96 |

FOREIGN PATENT DOCUMENTS 2242423  3/1973  Fed. Rep. of Germany ...... 324/395

Primary Examiner—Gerard R. Strecker
Assistant Examiner—Diep Do

[57] ABSTRACT

A sensor for detecting the firing of a spark plug while maintaining electrical isolation of electronic equipment is disclosed. In the preferred embodiment, a conductive element is attached to one electrical lead of a neon bulb. A wrap secures one end of an optical fiber to the neon bulb for collecting the light from the neon bulb. The optical fiber carries the light from the neon bulb to a data logging device. During use, the conductive element is secured to an insulated spark plug wire and, when the spark plug fires, a voltage between the leads of the neon bulb is induced, causing the neon bulb to produce a pulse of light. The light pulse from the neon bulb is carried by the optical fiber and monitored by the data logging device. By providing an optical fiber to link the data logging device to the neon bulb, electrical isolation is accomplished.

11 Claims, 4 Drawing Sheets

SPARK PLUG FIRING SENSOR WITH CAPACITIVE COUPLING AND OPTICAL PICKUP

TECHNICAL AREA OF THE INVENTION

The invention relates to the monitoring of voltage transients and, more particularly, the monitoring of voltage transients during spark plug firing.

BACKGROUND OF THE INVENTION

During diagnostic testing of internal combustion engines, such as those commonly found in automobiles or boats, it is important to be able to detect the firing of the spark plugs and compile this information. Accurate compilation of spark plug firing gives an indication of engine RPM and is often essential to fast diagnosis of engine performance. Moreover, measurement of engine RPM coupled with other information such as vehicle velocity can provide performance data regarding the engine and vehicle.

The accurate monitoring of the firing spark plugs generally necessitates an electronic recording device. However, the extremely large electromagnetic and electrostatic fields produced by a firing spark plug can cause electronic recording devices containing microprocessors to malfunction. The present invention is directed to avoiding the foregoing and other problems by providing an apparatus that uses an optical fiber to isolate an electronic recording device from electromagnetic and electrostatic interferences.

SUMMARY OF THE INVENTION

In accordance with this invention, an apparatus for electronically recording spark plug firing is disclosed. The apparatus comprises a capacitive pickup attached to one lead of a neon bulb. The capacitive pickup is secured to the spark plug wire of the firing spark plug. The other lead of the neon bulb is grounded. When the spark plug is fired, the voltage present on the spark plug wire produces a voltage in the capacitve pickup that causes the neon bulb to illuminate. Proximately disposed to the neon bulb is an optical fiber that collects light from the neon bulb. The fiber passes the light to a data recording device for tabulation, recording, or display. The data recording device is disposed away from the electromagnetic fields produced by the firing spark plug such that the electronics of the device are protected.

In accordance with other aspects of this invention, a neon bulb has both of its leads connected to ground. Disposed proximate to the neon bulb is an optical fiber that collects light from the neon bulb. The optical fiber passes the light to a data recording device for recording or display. The neon gas within the neon bulb is ionized directly and light is emitted in response to an electrostatic field caused by the firing spark plug.

In accordance with another aspect of this invention, an apparatus for recording an electromagnetic signal is disclosed. The apparatus comprises a wire coil attached to the leads of a LED. The wire coil is wrapped about a core material and the core is placed around the source of a fluctuating magnetic field. Current flows in the coil in response to a varying magnetic field. The varying magnetic field is caused by current flowing in the spark plug wire during firing. The current causes the LED to emit light. The emitted light is transmitted down an optical fiber disposed proximate the LED.

BRIEF DESCRIPTION OF THE DRAWINGS

The foregoing advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
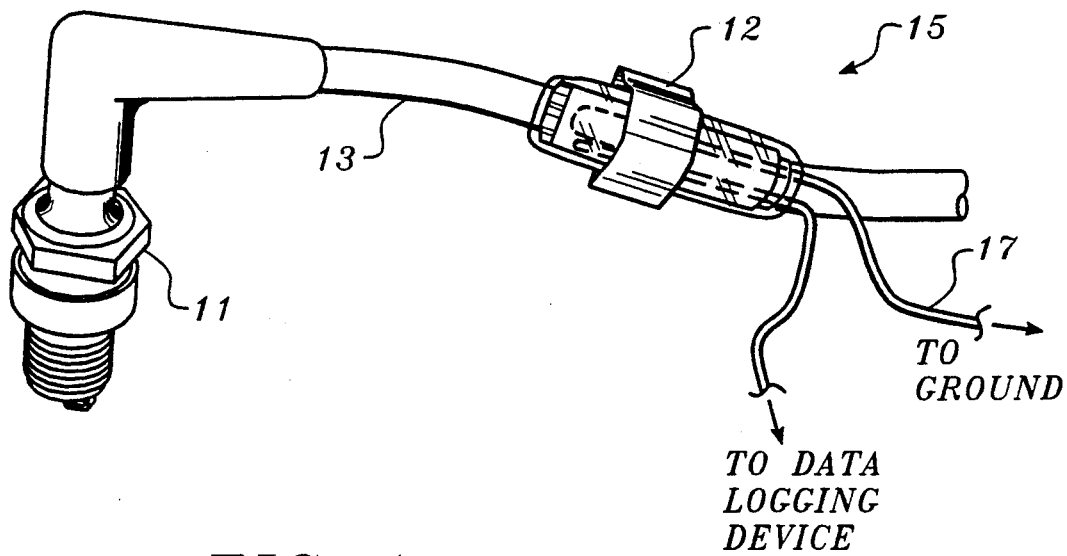
FIG. 1 is an isometric view of a sensor formed in accordance with the present invention, the sensor attached to a spark plug wire.

Referring to FIG. 1, a spark plug 11 is shown attached to an insulated spark plug wire 13. The spark plug 11 is shown isolated, although it can be appreciated that, in operation, the spark plug is inserted into a cylinder of an internal combustion engine. The insulated spark plug wire 13 has its other end connected to a distributor. The distributor in turn is connected to a high voltage source, such as a coil or magneto (not shown) via a secondary ignition wire. Both the spark plug wire 13 and the secondary ignition wire can also be known simply as ignition wires.

The spark plug firing sensor 15 is secured adjacent to the spark plug wire 13 by means of a metal clip 12. The sensor 15 has a generally cylindrical shape with a diameter approximately equal to the diameter of the spark plug wire 13. Although in this preferred embodiment, the metal clip 12 is shown as a clip-like device, it can be appreciated that many different methods of adhering the sensor 15 to the spark plug wire 13 are possible. Moreover, the clip 12 need not be formed of metal, but rather may be formed from materials such as plastic or composite fibers.

Figure 2:
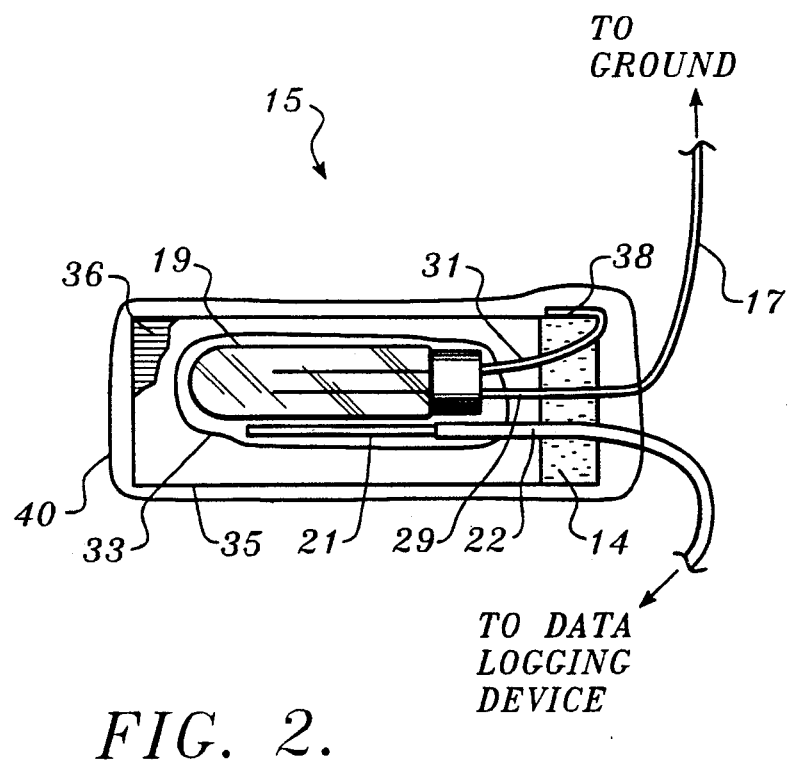
FIG. 2 is a pictorial view of the present invention.

Turning to FIG. 2, the sensor 15 is comprised of a ground wire 17, a capacitive sleeve 35, a neon bulb 19, and an optical fiber 21. Neon bulb 19 has a first electrical lead 29 and a second electrical lead 31. The first electrical lead 29 is conductively attached to the ground wire 17. The ground wire 17 has attached to its distal end a securing device (not shown), such as an "alligator clip". It can be appreciated that many different types of securing devices may be used; the important consideration is that the ground wire 17 must be selectively securable to an electrical ground structure.

Disposed adjacent to the neon bulb 19 is a first proximal end of optical fiber 21. In the preferred embodiment, the first proximal end of the optical fiber 21 is laid parallel to the longitudinal axis and along the surface of the neon bulb 19. Other arrangements are also possible, as long as the arrangement allows light emitted from neon bulb 19 to enter optical fiber 21. Normally, optical fiber 21 is protected by a plastic sheath material 22; however, the portion of optical fiber 21 adjacent to bulb 19 has been stripped of this plastic sheath 22 so that light from bulb 19 may couple into the optical fiber.

The optical fiber 21 is secured to the neon bulb 19 by means of a heat shrink wrap 33. The heat shrink wrap 33 conforms to the shape of neon bulb 19, thereby sandwiching the optical fiber 21 therebetween. Alternatively, a foil type wrap can be used to secure the optical fiber 21 to the neon bulb, the foil wrap having the added advantage of providing a reflective surface oriented towards the surface of neon bulb 19 that aids in gathering and concentrating the light from the neon bulb 19 into the optical fiber 21. The second end of optical fiber 21 is inserted into a data logging device (not shown) that can record or display information. As used in this application, data logging device is a term that encompasses any apparatus that can record or display information, or adapted to perform such function. For example, the data logging device can be a personal computer (PC). The data logging device receives light from the optical fiber 21 and converts the light into electronic signals. Moreover, optical fiber 21 should be of sufficient length to electrically isolate the data logging device and associated electronics from the electrical interference caused by firing spark plug 11.

The capacitive sleeve 35 is formed of a conductive metal. In the preferred embodiment shown, the sleeve 35 is of tubular shape with a first end 36 crimped such that the end is sealed. As will be seen below however, the sleeve 35 can be of varying shape, the important consideration being that the sleeve 35 be able to act as one "plate" of a capacitor. The sleeve 35 is disposed circumferentially about neon bulb 19 and heat shrink wrap 33, such that the bulb 19, the first proximal end of optical fiber 21, and shrink wrap 33 are disposed entirely within the tubular sleeve 35. The first electrical lead 29 and second electrical lead 31 of neon bulb 19 and the optical fiber 21 extend out from the other open end of capacitive sleeve 35. The second electrical lead 31, after exiting the interior of capacitive sleeve 35, is soldered to the outer surface of the capacitive sleeve at solder point 38. In order to secure the positioning of the sleeve 35 relative to the neon bulb 19, potting material 14 is applied to the open end of capacitive sleeve 35. This immobilizes and secures the electrical leads and optical fiber 21 of the sensor 15. An acceptable potting material would be an epoxy or glue material. Finally, a second shrink wrap 40 encases the capacitive sleeve 35, allowing only the grounding wire 17 and optical fiber 21 to extend therefrom. The second shrink wrap 40 affords additional protection to the sensor 15.

The use of the sensor involves attaching the sensor 15 to a spark plug wire using the metal clip 12 (as shown in FIG. 1). Although the positioning of the sensor 15 on the spark plug wire is not crucial, optimally, the sensor 15 should be as far as possible from other spark plug wires to reduce electromagnetic and electrostatic interference. In one alternative arrangement, the sensor can be attached to the secondary ignition wire. As noted earlier, the secondary ignition wire typically connects the ignition coil to the distributor. Next, the grounding clip 17 should be attached to an electrical ground such as the engine block.

Figure 3:
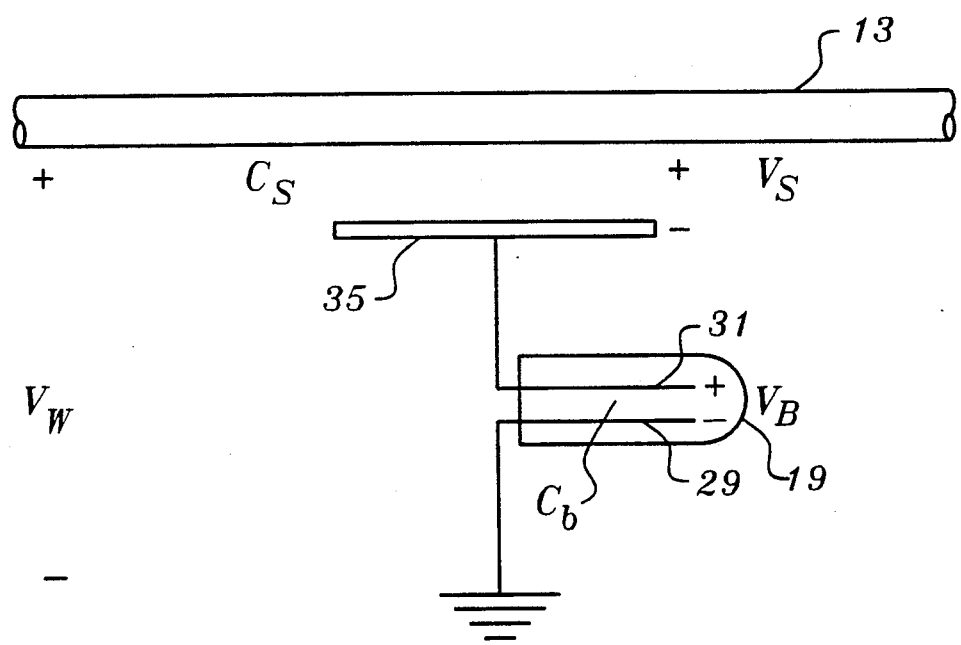
FIG. 3 is an electrical schematic illustrating the operation of the present invention.

With reference to FIG. 3, an electrical schematic is shown that illustrates the operation of the present invention. As is well known in the art, a spark plug fires in response to a high voltage transient present on an insulated spark plug wire 13. During firing of the spark plug, there exists a wire potential $V_w$ between the spark plug wire 13 and electrical ground. By placing the sensor of the present invention adjacent to the spark plug wire, a capacitive divider is formed. Specifically, a first capacitor $C_s$ is formed by the spark plug wire and the capacitive sleeve, i.e., the capacitive sleeve 35 is one "plate" of the capacitor and the spark plug wire 13 is the other "plate" of the capacitor. Moreover, a second capacitor $C_b$ is formed from the two leads of the neon bulb, i.e., the first lead 29 is one "plate" and the second lead 31 is the other "plate". The first ($C_s$) and second ($C_b$) capacitors are connected in series, electrically spanning the spark plug wire and electrical ground.

As noted earlier, when the spark plug 11 is fired, a voltage $V_w$ is present between the spark plug wire and electrical ground. This same voltage potential must also be present between the spark plug wire 13 and the first electrical lead 29, since the first lead is also at electrical ground. Thus, the sum of the voltage across the first capacitor $C_s$ and the second capacitor $C_b$ must equal $V_w$. The voltage across the capacitor $C_s$ is denoted as $V_s$. The voltage across the capacitor $C_b$ is denoted as $V_b$. Similarly, it follows that $V_w$ minus $V_s$ equals the voltage across the bulb $V_b$. This voltage across the first and second electrical leads $V_b$ causes the bulb to emit light. Finally, the emitted light from the neon bulb 19 is coupled into optical fiber 21. The light in optical fiber 21 is then carried to the data logging device for display, recording or tabulation.

In order to have maximum signal to the bulb, i.e., a large $V_b$, the voltage $V_s$ must be small. The voltage $V_s$ is inversely proportional to the capacitance $C_s$ for a given charge on the spark plug wire 13. In other words, if $C_s$ is large then the signal to the bulb will be large. The capacitance $C_s$ is determined in part by the area of the plates forming the capacitor and the distance between the plates. Specifically, as the distance separating the plates decreases, the capacitance increases. Thus, as noted earlier, it is advantageous to have the sensor as near the spark plug wire as possible.

Figure 4:
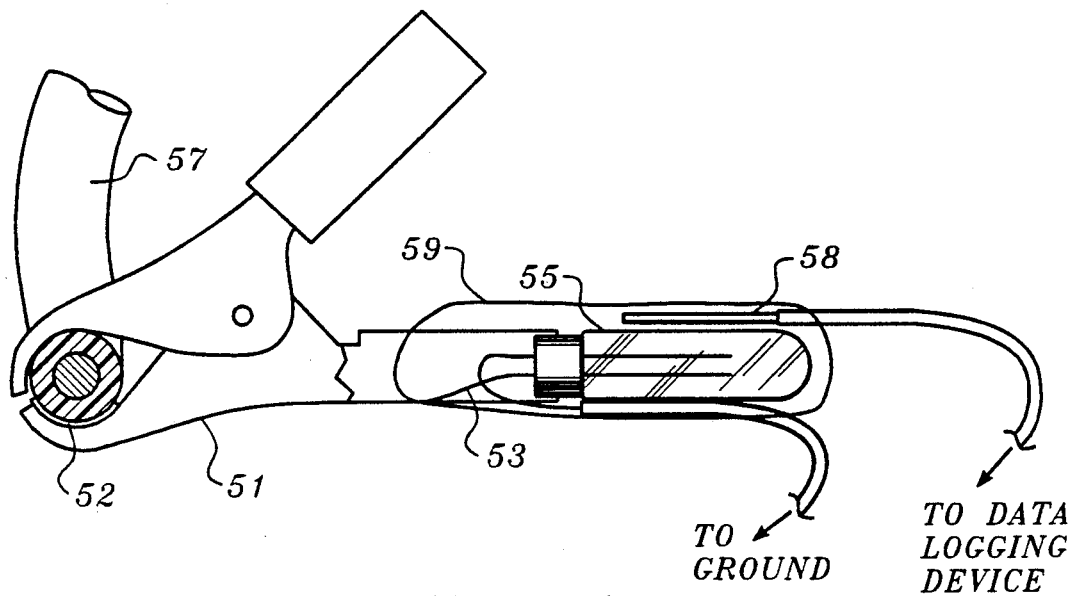
FIG. 4 is a pictorial view of an alternative embodiment of the present invention utilizing a capacitive clip.

In an alternative embodiment shown in FIG. 4, the capacitive sleeve 35 has been replaced with a capacitive clip 51. The capacitive clip 51 incorporates a large capacitive plate 52 that is disposed adjacent to a spark plug wire 57 when the clip is attached thereto. The capacitive clip 51 is conductively attached to the second electrical lead 53 of neon bulb 55. In use, the capacitive clip 51 can be clamped onto the spark plug wire 57. This embodiment is substantially the same as the preferred embodiment except that the capacitive pickup is now a large metallic plate 52 and not a capacitive sleeve. As noted earlier, a plate having a large area increases the capacitance, which in turn, increases the signal to the bulb. As in the preferred embodiment, heat shrink wrap 59 sandwiches the optical fiber 58 to the neon bulb 55. This embodiment operates in substantially the same manner. The capacitive plate 52 and the spark plug wire 13 form one capacitor. The two leadss of the neon bulb form another capacitor. A capacitive divider is created that produces a voltage across the leads of the neon bulb when the spark plug wire is at a high voltage potential.

Figure 5:
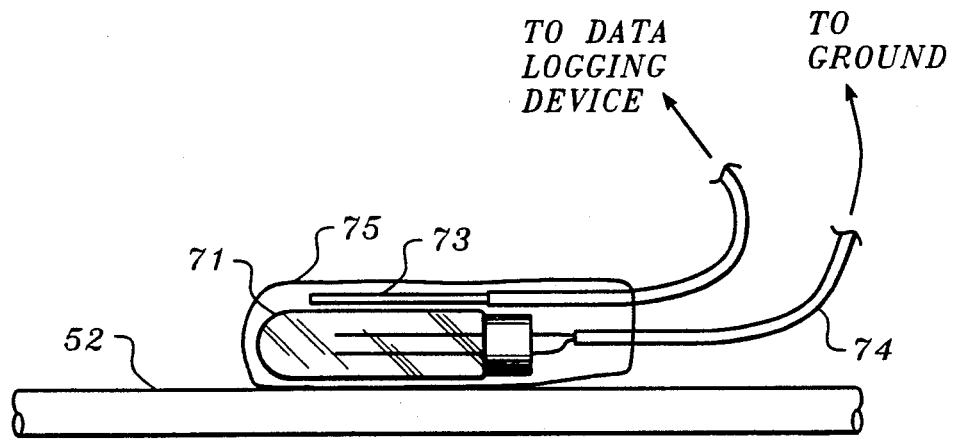
FIG. 5 is a pictorial view of another embodiment of the present invention.

Referring to FIG. 5, another embodiment is shown. The capacitive sleeve 35 has been eliminated and both the first and second electrical leads of the neon bulb are attached to the grounding wire 74. In this embodiment, the electrostatic field ionizes the gas in the bulb directly, thereby emitting a pulse of light that enters optical fiber 73. The heat shrink wrap 75 serves to attach the optical fiber 73 to the neon bulb 71. This embodiment requires a larger electrostatic transient to trigger, however, it has a lower manufacturing cost.

Figure 6:
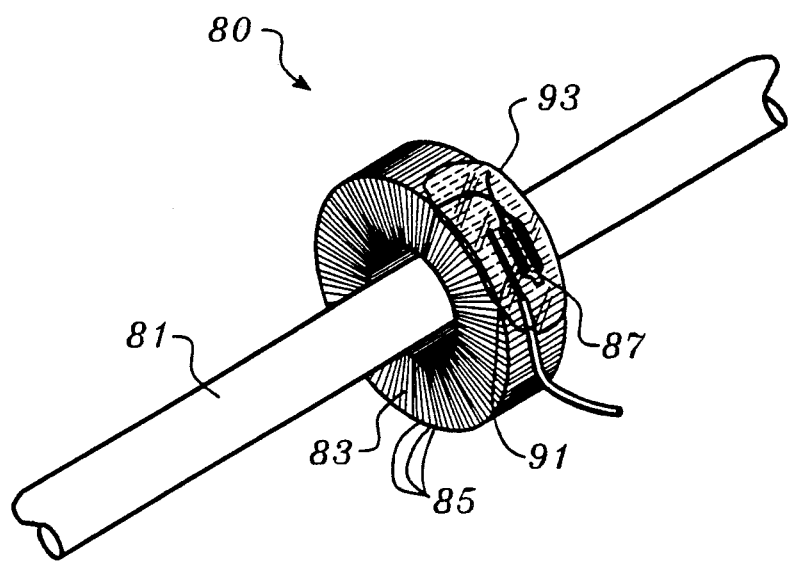
FIG. 6 is a pictorial view of another embodiment of the present invention utilizing an electromagnetic pickup.

Referring to FIG. 6, in yet another embodiment of the present invention, the spark plug sensor 80 senses a changing magnetic field in the spark plug wire 81. The changing magnetic field is caused by the flow of current as the spark plug is fired. In this embodiment, a magnetic core 83 of toroidal shape is placed surrounding the spark plug wire 81. This can be done by disconnecting the spark plug wire 81 and passing the wire through the center of the core and then reattaching the wire. Coiled about substantially the entire circumference of the magnetic core 83 is a wire coil 85. The wire coil 85 is comprised of a length of conducting wire, such as copper wire. The wire coil 85 is coiled about the magnetic core 83 in a series of adjacent loops, each loop orthogonal to an arc segment of the core 83. Although FIG. 6 shows the entire circumference of the magnetic core 83 coiled by the wire coil 85, it can be appreciated by those skilled in the art that the wire coil 85 need not cover the entire circumference, but rather need only cover a portion of the magnetic core 83. One end of the wire coil 85 is attached to the first lead of a LED 87. The other end of the wire coil 85 is attached to the second lead of the LED 87.

The LED 87 is disposed adjacent to the magnetic core 83. Disposed adjacent and in optical coupling arrangement with the LED 87 is an optical fiber 91. Light emitted from the LED 87 is coupled into the optical fiber 91 for transference to a data logging device (not shown). Moreover, a potting compound 93 secures the LED 87 and optical fiber 91 to the magnetic core 83.

In operation, when the spark plug is fired, the spark plug wire 81 carries a current that causes the magnetic field surrounding the spark plug wire 81 to vary. This varying magnetic field induces a current to flow within the wire coil 85. Because the wire coil is connected to the LED 87, the current flow will cause the LED 87 to emit light. The light is coupled into fiber optic 91 and carried to the data logging device for recording, display, or tabulation. Thus, in this alternative embodiment, the sensing mechanism is a magnetic core surrounded by a wire coil which produces a voltage across an LED 87, in contrast to the prior embodiments that utilized an inductive element to create a voltage across a bulb. Once again, it can be appreciated that the exact mechanism for creating a voltage across the bulb is not critical, and in fact many different types of voltage generating sensing elements may be used.

While a preferred embodiment of the invention has been illustrated and described, it will be appreciated that various changes can be made therein without departing from the spirit and scope of the invention. For example, while the preferred apparatus uses a neon bulb, any inert gas bulb can be utilized. Also, although the description has been given in terms of firing spark plugs in an internal combustion engine environment, the sensor of the present invention can be applied to monitoring transient voltages present on any conductor. Moreover, although disclosed are embodiments utilizing a capacitive sleeve and a capacitive clip to act as the electrostatic pickup, numerous alternatives are available to serve as the capacitive pickup. Thus, within the scope of the appended claims, it is to be understood that the invention can be practiced otherwise than as specifically described herein.

The embodiments of the invention in which an exclusive property or privilege is claimed are defined as follows:

1. A sensor for detecting a transient electrical potential in a conductor, said sensor comprised of a bulb having a first lead and a second lead, said first and second leads forming a bulb capacitor for carrying a bulb voltage, said bulb emitting light when said bulb voltage reaches a predetermined level, an optical fiber having a first end and a second end, said first end disposed adjacent to said bulb such that light emitted from said bulb is coupled into said first end of said optical fiber as an optical signal, and a conductive sleeve element conductively attached to said second lead, said conductive sleeve element along with said conductor forming a capacitor, whereby said transient electrical potential charges said capacitor and said bulb capacitor, said bulb capacitor charged to said predetermined voltage causing said bulb to emit light when said sensor is proximate to said conductor.

2. The sensor of claim 1, further comprising means for maintaining said first and second leads of said bulb at a lower electrical potential than said transient electrical potential, said bulb containing an inert gas that emits light when ionized, said transient electrical potential directly ionizing said inert gas when said sensor is proximate to said conductor.

3. The sensor of claim 1, wherein said conductive sleeve element substantially encases said bulb.

4. A sensor for detecting a transient electrical potential in a conductor, said sensor comprised of a bulb having a first lead and a second lead, an optical fiber having a first end and a second end, said first end disposed adjacent to said bulb such that light emitted from said bulb is coupled into said first end of said optical fiber as an optical signal, an induction coil including a core and a conducting wire having a first end and a second end, said conducting wire coiled around said core, said first end of said conducting wire electrically connected to said first lead of said bulb, said second end of said conducting wire electrically connected to said second lead, said transient electrical potential inducing a current to flow in said conducting wire, said current causing said bulb to emit light.

5. The sensor of claim 4, wherein said core is a magnetic core.

6. The sensor of claim 4, wherein said core is a metallic core.

7. A sensor for monitoring the firing of a spark plug in an internal combustion engine, said spark plug firing in response to a transient electrical potential on a spark plug wire, said sensor comprising:
   (a) a bulb having a first lead and a second lead, said first and second leads forming a first capacitor, said first capacitor capable of carrying a bulb voltage, said bulb emitting light when said bulb voltage reaches a predetermined level;
   (b) an optical fiber having a first end and a second end, said first end disposed adjacent to said bulb such that light emitted from said bulb is coupled into said first end of said optical fiber as an optical signal, said optical signal indicative of said transient electrical potential, and
   (c) a capacitive plate element conductively attached to said second lead, said capacitive plate element along with said spark plug wire forming a second capacitor, whereby said transient electrical potential charges said second capacitor and said first capacitor, said first capacitor charged to said predetermined voltage causing said bulb to emit light when said sensor is proximate to said spark plug wire.

8. The sensor of claim 7, further comprising means for maintaining said first and second leads of said bulb at a lower electrical potential than said transient electrical potential, said bulb containing an inert gas that emits light when ionized, said transient electrical potential directly ionizing said inert gas.

9. The sensor of claim 7, wherein said capacitive plate element is a capacitive sleeve that substantially encases said bulb.

10. The sensor of claim 7, in combination with a data logging device for recording said optical signal.

11. A system for monitoring RPM in an internal combustion engine, said internal combustion engine including at least one spark plug and at least one ignition wire, said spark plug firing in response to a voltage on said ignition wire, said system comprising:

(a) a bulb having a first lead and a second lead, said first and second leads forming a bulb capacitor, said bulb capacitor for carrying a bulb voltage, said bulb emitting light when said bulb voltage exceeds a predetermined level;

(b) a conductive sleeve element conductively attached to said second lead, said conductive sleeve element in conjunction with said spark plug wire forming a capacitor, said conductive sleeve element proximately disposed to said spark plug wire;

(c) an optical fiber having a first end and a second end, said first end disposed adjacent to said bulb such that light emitted from said bulb is coupled into said first end of said optical fiber as an optical signal; and (c) a data logging device for receiving and storing said optical signal from said second end of said optical fiber, said data logging device including computing means for calculating RPM from said optical signal, whereby said voltage on said ignition wire charges said bulb capacitor to said bulb voltage exceeding said predetermined level.

* * * * *